(12) United States Patent
Ishiki et al.

(10) Patent No.: US 7,268,093 B2
(45) Date of Patent: Sep. 11, 2007

(54) GLAZE COMPOSITION AND ANTIFOULING CERAMIC WARE

(75) Inventors: Shigeru Ishiki, Neyagawa (JP);
Masayuki Ishihara, Neyagawa (JP);
Kazuhiro Matsuura, Fukui (JP);
Kanjanatanom Othong, Pathumthani (TH)

(73) Assignee: American Standard International, Inc., New York, NY (US)

( * ) Notice: Subject to any disclaimer, the term of this patent is extended or adjusted under 35 U.S.C. 154(b) by 304 days.

(21) Appl. No.: 10/481,577

(22) PCT Filed: Jul. 1, 2002

(86) PCT No.: PCT/JP02/06660

§ 371 (c)(1),
(2), (4) Date: Apr. 6, 2004

(87) PCT Pub. No.: WO03/004428

PCT Pub. Date: Jan. 16, 2003

(65) Prior Publication Data

US 2004/0152579 A1  Aug. 5, 2004

(30) Foreign Application Priority Data

Jul. 5, 2001  (JP) .............................. 2001-205208

(51) Int. Cl.
*C03C 8/02* (2006.01)
*C03C 8/14* (2006.01)
*C03C 8/16* (2006.01)

(52) U.S. Cl. .............................. 501/21; 501/17; 501/20

(58) Field of Classification Search ................ 501/14, 501/17, 20, 21, 26, 69, 70
See application file for complete search history.

(56) References Cited

U.S. PATENT DOCUMENTS

| 4,340,645 | A | * | 7/1982 | O'Conor | .................... 428/428 |
| 4,732,794 | A | * | 3/1988 | Hyde | .................... 428/210 |
| 5,200,369 | A | * | 4/1993 | Clifford et al. | ................. 501/66 |
| 5,244,848 | A | * | 9/1993 | Clifford et al. | ................. 501/66 |
| 5,348,914 | A | * | 9/1994 | Thometzek et al. | ............ 501/18 |
| 5,382,552 | A | | 1/1995 | Saad et al. | |
| 6,174,608 | B1 | * | 1/2001 | Bertocchi et al. | ........... 428/426 |
| 6,548,162 | B1 | * | 4/2003 | Machida et al. | ............. 428/336 |

FOREIGN PATENT DOCUMENTS

| EP | 0 931 772 A1 | 7/1999 |
| GB | 2 154 573 A1 | 9/1985 |
| JP | 03-075242 A1 | 3/1991 |

OTHER PUBLICATIONS

International Search Rerport for PCT/JP02/06660 mailed on Nov. 11, 2002.
International Preliminary Examination Report for PCT/JP02/06660 completed on May 30, 2003.

* cited by examiner

*Primary Examiner*—J. A. Lorengo
*Assistant Examiner*—Elizabeth A. Bolden
(74) *Attorney, Agent, or Firm*—Frommer Lawrence & Haug LLP

(57) ABSTRACT

A glaze composition can be used to provide a glaze layer having excellent antifouling performance and visual beauty. The glaze composition contains a glaze forming material, which has a composition determined such that a baked product obtained by baking the glaze composition comprises 55.0 to 67.0 wt % of $SiO_2$; 8.0 to 11.0 wt % of $Al_2O_3$; 2.0 to 8.0 wt % of $SnO_2$; 15.0 to 21.0 wt % of a divalent metal oxide; and 4.0 to 6.0 wt % of a monovalent metal oxide, with respect to a total weight of the baked product. When a glaze layer is formed by use of this glaze composition, it resists contamination. Even when a dirt deposits on the glaze layer, the dirt can be easily removed from the glaze layer. In addition, the glaze composition can provide a beautiful semi-opaque glaze layer with luster and a reduction in pore generation amount.

23 Claims, 3 Drawing Sheets

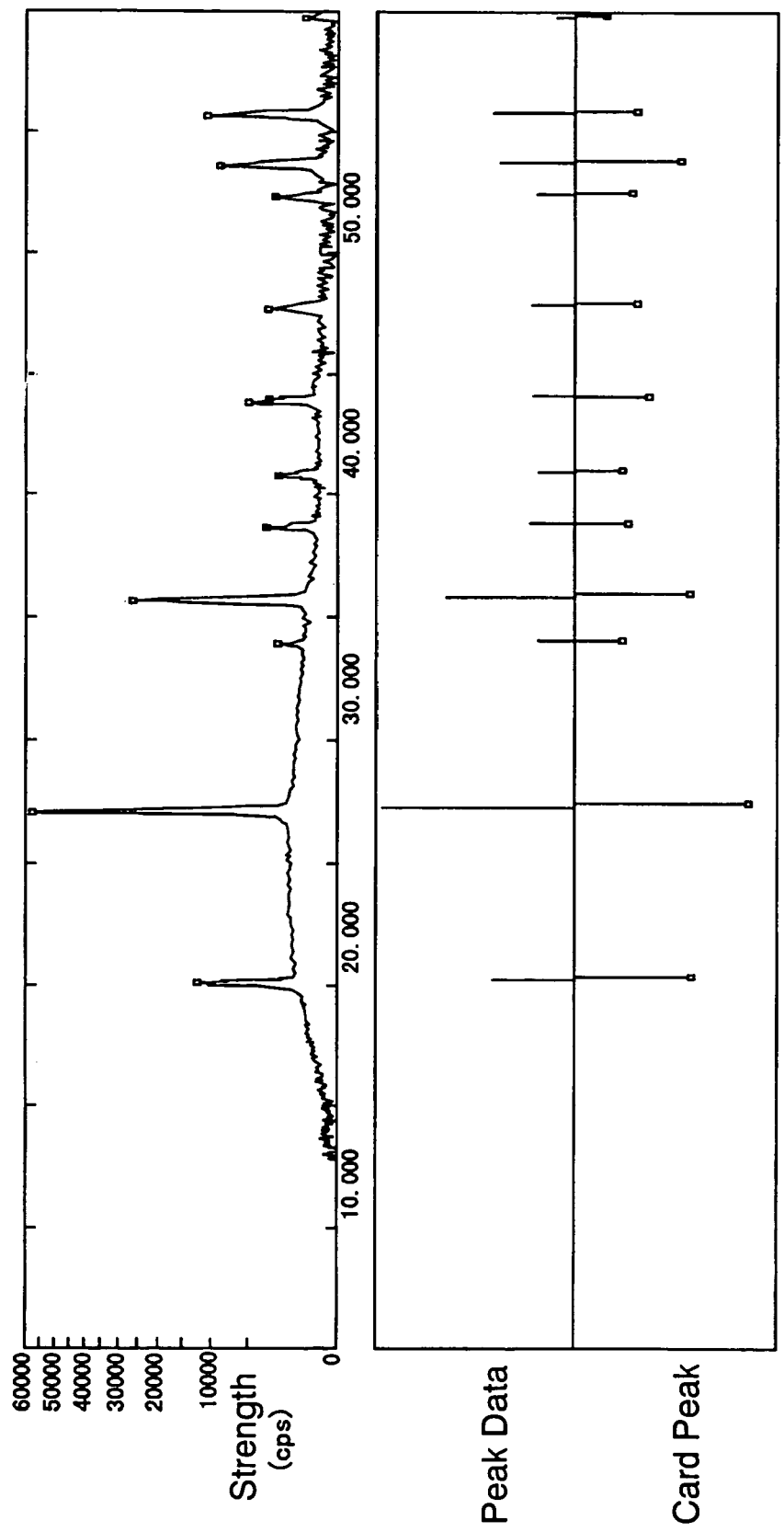

GLAZE COMPOSITION AND ANTIFOULING CERAMIC WARE

TECHNICAL FIELD

The present invention relates to a glaze composition, which is preferably used to form a glaze layer having excellent antifouling performance and good appearance, and an antifouling ceramic ware having the glaze layer.

BACKGROUND ART

Glazes are widely used to protect ceramic wares from contamination and provide beautiful appearance of the ceramic wares. In general, a glaze layer can be formed on a ceramic ware by applying a glaze thereon, and baking the applied glaze. Thus, since the glaze layer presents resistance to contamination and the beautiful appearance to the ceramic ware, it is being widely used in application areas of ceramic sanitary wares for toilets and bathrooms as well as general ceramic wares.

However, when the conventional glazes are used, there are problems that a yet-to-be dissolved substance easily remains in the glaze layer, or zirconium silicate of an emulsion agent is crystallized to appear on the outermost surface of the glaze layer. As a consequence, a beautiful, smooth surface with luster of the glaze layer can not be obtained.

In addition, there is a room for further improvement of the antifouling performance of the glaze layer. For example, to improve the antifouling performance, it is proposed to form a transparent glaze layer consisting of amorphous materials. In this case, the antifouling performance can be improved to some extent. However, it becomes difficult to provide the beautiful appearance of the glaze layer to articles because of the transparency of the glaze layer. Due to this reason, it will be necessary to form another glaze layer having a desired color between the transparent glaze layer and the ceramic ware. This two-layer structure leads to an increase in production time and cost.

In addition, in the case of using tin oxide or bone ash as the emulsion agent in conventional glazes for ceramic ware, there are problems that pore generation amount in the glaze layer after baking increases, and a beautiful semi-opaque glaze layer is not obtained by baking. For example, it is proposed to use a glaze having the composition of 80 wt % of $SiO_2$; 6.5 wt % of $Al_2O_3$; 0.2 wt % of $Fe_2O_3$; 0.8 wt % of MgO; 8 wt % of CaO; 3 wt % of ZnO; 1 wt % of $K_2O$; 0.5 wt % of NaO; 5 wt % of $SnO_2$ (median diameter: 5 μm). However, this glaze is not melted even when baked at the temperature of 1200° C. In addition, there is a room of improvement in the antifouling performance and a degree of luster of the glaze layer.

SUMMARY OF THE INVENTION

In view of the above fact, a purpose of the present invention is to provide a glaze composition having the capability of forming a glaze layer that is excellent in resistance to contamination and easiness of removing dirt and has a beautiful appearance, and antifouling ceramic wares having the glaze layer.

That is, a glaze composition of the present invention is characterized by containing a glaze forming material, which has a composition determined such that a baked product obtained by baking the glaze composition comprises 55.0 to 67.0 wt % of $SiO_2$; 8.0 to 11.0 wt % of $Al_2O_3$; 2.0 to 8.0 wt % of $SnO_2$; 15.0 to 21.0 wt % of a divalent metal oxide; and 4.0 to 6.0 wt % of a monovalent metal oxide, with respect to a total weight of the baked product.

It is preferred that the glaze composition contains the glaze forming material having the capability of forming a glaze layer by baking, and the glaze forming material comprises, with respect to a total weight of the glaze forming material, (a) 55.0 to 67.0 wt % of silicon constituent by $SiO_2$ conversion;
(b) 8.0 to 11.0 wt % of aluminum constituent by $Al_2O_3$ conversion;
(c) 2.0 to 8.0 wt % of tin constituent by $SnO_2$ conversion;
(d) 15.0 to 21.0 wt % of a divalent metal constituent by oxide conversion; and
(e) 4.0 to 6.0 wt % of a monovalent metal constituent by oxide conversion.

In particular, It is preferred that the glaze composition contains the glaze forming material, which comprises, with respect to a total weight of the glaze forming material, (a) 63.0 to 67.0 wt % of silicon constituent by $SiO_2$ conversion;
(b) 8.0 to 10.0 wt % of aluminum constituent by $Al_2O_3$ conversion;
(c) 2.0 to 4.0 wt % of tin constituent by $SnO_2$ conversion;
(d) 16.0 to 20.0 wt % of a divalent metal constituent by oxide conversion; and
(e) 4.0 to 6.0 wt % of a monovalent metal constituent by oxide conversion.

In addition, it is preferred that the constituent (d) comprises, with respect to the total weight of the glaze forming material, (d1) 10.0 to 12.0 wt % of calcium constituent by CaO conversion; and
(d2) 5.0 to 8.0 wt % of zinc constituent by ZnO conversion.

It is also preferred that the constituent (d) comprises (d3) 1.0 wt % or less of magnesium constituent by MgO conversion, with respect to the total weight of the glaze forming material.

It is further preferred that the monovalent metal constituent (e) comprises, with respect to the total weight of the glaze forming material, (e1) 1.0 wt % or more of sodium constituent by $Na_2O$ conversion; and
(e2) 1.0 wt % or more of potassium constituent by $K_2O$ conversion.

In a preferred embodiment of the present invention, the glaze forming material comprises a frit, which is obtained by vitrifying a material containing at least one of the constituents (a) to (e) and grinding the vitrified material.

It is preferred that a material containing the constituent (a) of the glaze forming material is a powder having a particle size of 30 μm or less.

It is preferred that a material containing the constituent (c) of the glaze forming material is a powder having a median diameter of 0.2 to 4.0 μm.

It is also preferred that a median diameter after grinding and mixing of the glaze forming material is within a range of 4 to 5 μm.

In addition, it is preferred that the glaze forming material contained in the glaze composition is prepared by grinding a material containing at least one of the constituents (a) and (c) to obtain a powder or a slurry, then mixing materials containing the remaining constituents with the powder or the slurry, and grinding a resultant mixture to obtain a powder of the glaze forming material having a required particle size or a slurry thereof.

It is preferred that the glaze forming material is prepared by grinding a material containing the constituent (a) to obtain a powder having a median diameter of 5 μm or less or a slurry thereof, then mixing materials containing the remaining constituents (b) to (e) with the powder or the slurry, and grinding a resultant mixture to obtain a powder of the glaze forming material having a required particle size or a slurry thereof.

It is preferred that the glaze forming material is prepared by grinding a material containing the constituent (c) to obtain a powder having a median diameter of 1.5 to 2 μm or a slurry thereof, then mixing materials containing the remaining constituents (a), (b), (d) and (e) with the powder or the slurry, and grinding a resultant mixture to obtain a powder of said glaze forming material having a required particle size or a slurry thereof.

It is preferred that the glaze forming material is prepared by grinding materials containing the constituents (a) and (c) to obtain a mixed powder having a median diameter of 5 μm or less or a slurry thereof, then mixing materials containing the remaining constituents (b), (d) and (e) with the mixed powder or the slurry, and grinding a resultant mixture to obtain a powder of the glaze forming material having a required particle size or a slurry thereof.

It is also preferred that the glaze forming material is prepared by grinding a material containing the constituent (a) to obtain a powder having a median diameter of 5 μm or less or a slurry thereof, then mixing materials containing the remaining constituents (b) to (e) with the powder or the slurry, and grinding a resultant mixture to obtain a powder of the glaze forming material having a median diameter of 4 to 5 μm or a slurry thereof.

It is further preferred that the glaze forming material is prepared by grinding a material containing the constituent (c) to obtain a powder having a median diameter of 1.5 to 2 μm or a slurry thereof, then mixing materials containing the remaining constituents (a), (b), (d) and (e) with the powder or the slurry, and grinding a resultant mixture to obtain a powder of the glaze forming material having a median diameter of 4 to 5 μm or a slurry thereof.

It is preferred that the glaze forming material is prepared by grinding materials containing the constituents (a) and (c) to obtain a mixed powder having a median diameter of 5 μm or less or a slurry thereof, then mixing materials containing the remaining constituents (b), (d) and (e) with the mixed powder or the slurry, and grinding a resultant mixture to obtain a powder of the glaze forming material having a median diameter of 4 to 5 μm or a slurry thereof.

Moreover, it is preferred that the materials containing the constituents of said glaze forming material are ground by means of ball milling using alumina balls. In particular, it is preferred that materials containing the constituents of the glaze forming material are ground by means of ball milling using a pot with an alumina liner and alumina balls.

It is preferred that the glaze composition comprises a pigment.

Another object of the present invention is to provide an antifouling ceramic ware, which is produced by forming a layer of the glaze composition of the present invention on a dried base surface of a raw ceramic ware, and baking the layer at a temperature of 1150 to 1250° C. for 8 hours or more to form a glaze layer on a baked base surface of the ceramic ware.

In a preferred embodiment of the present invention, an X-ray diffraction profile of the glaze layer of the antifouling ceramic ware has only diffraction peaks resulting from $SnO_2$ crystal. Alternatively, it is preferred that an X-ray diffraction profile of the glaze layer has only diffraction peaks resulting from $CaSnSiO_5$ crystal. Moreover, it is preferred that an X-ray diffraction profile of the glaze layer has only diffraction peaks resulting from crystals of $SnO_2$ and $CaSnSiO_5$.

In addition, it is preferred that a thickness of the glaze layer is within a range of 0.2 to 1.2 mm.

These and still other objects and advantages will become apparent from the following detail description and Examples of the invention, referring to the attached drawings.

BRIEF EXPLANATION OF THE DRAWINGS

FIG. 3A is an X-ray diffraction profile of a glaze layer of Comparative Example 1, and FIG. 3B is a diagram showing a relation between the X-ray diffraction profile of FIG. 3A and an X-ray diffraction profile of a zirconium silicate crystal obtained by simulation.

DETAIL DESCRIPTION OF THE INVENTION

Figure 1A:
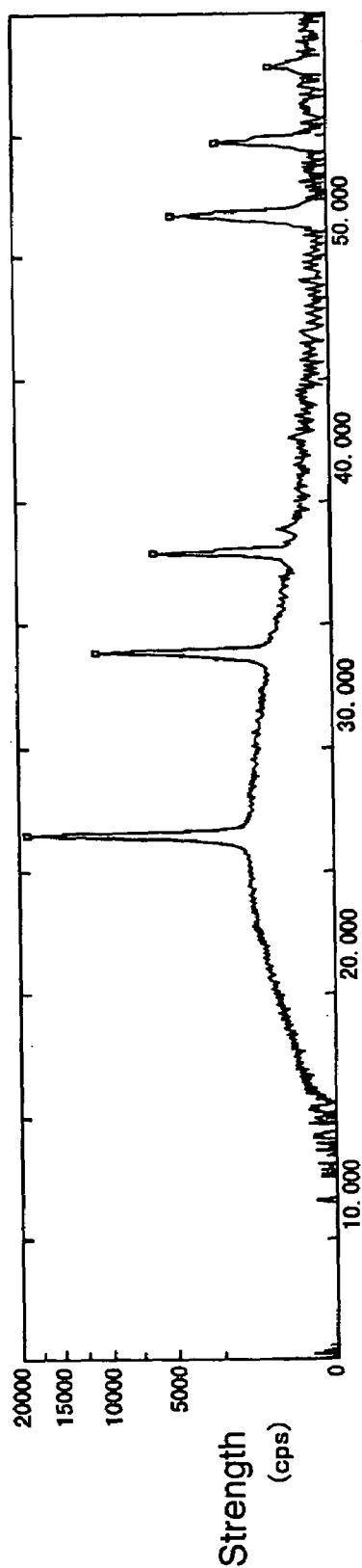
FIG. 1A is an X-ray diffraction profile of a glaze layer of Example 1.

A glaze composition of the present invention contains a glaze forming material. To improve easiness of applying the glaze composition on articles, for example, articles of base materials for ceramic wares, the glaze composition may preferably contain water and/or various binders.

The glaze forming material of the present invention comprises silicon constituent, aluminum constituent, tin constituent, a divalent metal constituent, and a monovalent metal constituent. The composition of the glaze forming material is determined such that a baked product obtained by baking the glaze composition comprises 55.0 to 67.0 wt % of $SiO_2$; 8.0 to 11.0 wt % of $Al_2O_3$; 2.0 to 8.0 wt % of $SnO_2$; 15.0 to 21.0 wt % of a divalent metal oxide; and 4.0 to 6.0 wt % of a monovalent metal oxide, with respect to a total weight of the baked product. In other words, the contents of these constituents are determined so as to comprise, with respect to a total weight of the glaze forming material, (a) 55.0 to 67.0 wt % of silicon (Si) constituent by $SiO_2$ conversion; (b) 8.0 to 11.0 wt % of aluminum (Al) constituent by $Al_2O_3$ conversion; (c) 2.0 to 8.0 wt % of tin (Sn) constituent by $SnO_2$ conversion; (d) 15.0 to 21.0 wt % of the divalent metal constituent by oxide conversion; and (e) 4.0 to 6.0 wt % of the monovalent metal constituent by oxide conversion.

When the content of the Si constituent is less than 55.0 wt %, the antifouling performance of the glaze layer can not be sufficiently obtained. In addition, there is a case that the appearance of the glaze layer deteriorates because of an increase in pore generation amount and a degradation of color (semi-opaque) of the glaze layer. On the other hand, when the content of the Si constituent is more than 67.0 wt %, the antifouling performance of the glaze layer deteriorates. In addition, the pore generation amount increases, and the degradation of color (semi-opaque) of the glaze layer occurs.

When the content of the Al constituent is less than 8.0 wt %, the antifouling performance of the glaze layer can not be sufficiently obtained, and the pore generation amount in the glaze layer increases. On the contrary, when the content of the Al constituent is more than 11.0 wt %, an effect of improving the color (semi-opaque) of the glaze layer, which is brought by the presence of the Sn constituent in the glaze forming material, is prevented.

When the content of the Sn constituent is less than 2.0 wt %, the color (semi-opaque) of the glaze layer can not be sufficiently improved. When the content of the Sn constituent is more than 8.0 wt %, the antifouling performance of the glaze layer deteriorates.

When the contents of the divalent metal constituent is less than 15.0 wt %, or the content of the monovalent metal constituent is less than 4.0 wt %, a vitrification of the glaze forming material is prevented at a baking step described later. This leads to insufficient antifouling performance. In addition, the luster of the glaze layer becomes poor. On the contrary, when the content of the divalent metal constituent is more than 21.0 wt %, or the content of the monovalent metal constituent is more than 4.0 wt %, the antifouling performance deteriorates, and the pore generation amount in the glaze layer increases.

As the divalent metal constituent, for example, calcium (Ca) constituent, zinc (Zn) constituent, and/or magnesium (Mg) constituent can be used. In particular, it is preferred that the glaze forming material comprises, as the divalent metal constituent, (d1) 10.0 to 12.0 wt % of calcium constituent by CaO conversion; and (d2) 5.0 to 8.0 wt % of zinc constituent by ZnO conversion, with respect to the total weight of the glaze forming material. In this case, it is possible to stably obtain the improved antifouling performance and the luster of the glaze layer.

In addition, when the contents of the Ca and Zn constituents are within the above ranges, a small amount of the Mg constituent may be contained in the glaze forming material. That is, it is preferred that the content of the Mg constituent is less than 1.0 wt % of magnesium constituent by MgO conversion, with respect to the total weight of the glaze forming material. The lower limit of the content of the Mg constituent is not limited. For example, it may be 0.1 wt %.

As the monovalent metal constituent, for example, sodium (Na) constituent and/or potassium (K) constituent, can be used. In particular, it is preferred that the glaze forming material comprises, as the monovalent metal constituent, (e1) 1.0 wt % or more of sodium constituent by $Na_2O$ conversion; and (e2) 1.0 wt % or more of potassium constituent by $K_2O$ conversion, with respect to the total weight of the glaze forming material. In this case, it is possible to obtain the glaze layer with good luster and further improve the antifouling performance. When the content of the Na constituent is substantially equal to the content of K constituent, better results are obtained. In consideration of the content of the monovalent metal constituent, which is within the range of 4.0 to 8.0 wt %, the upper limit of the content of each of the Na and K constituents may be 4 wt %, and preferably 3 wt %.

It is particularly preferred that the contents of these constituents are determined to comprise, with respect to a total weight of the glaze forming material, (a) 63.0 to 67.0 wt % of silicon constituent by $SiO_2$ conversion; (b) 8.0 to 10.0 wt % of aluminum constituent by $Al_2O_3$ conversion; (c) 2.0 to 4.0 wt % of tin constituent by $SnO_2$ conversion; (d) 16.0 to 20.0 wt % of a divalent metal constituent by oxide conversion; and (e) 4.0 to 6.0 wt % of a monovalent metal constituent by oxide conversion. In other words, the composition of the glaze forming material is determined such that a baked product obtained by baking the glaze composition comprises 63.0 to 67.0 wt % of $SiO_2$; 8.0 to 10.0 wt % of $Al_2O_3$; 2.0 to 4.0 wt % of $SnO_2$; 16.0 to 20.0 wt % of the divalent metal oxide; and 4.0 to 6.0 wt % of the monovalent metal oxide, with respect to a total weight of the baked product.

Usually, a raw material containing the Sn constituent is more expensive than the raw materials containing the other constituents. Therefore, as the amount used of the raw material containing the Sn constituent reduces, the total cost performance of the glaze composition can be improved. Even when the content of the Sn constituent is within the range of 2.0 to 4.0 wt %, the beautiful semi-opaque glaze layer can be still obtained because the glaze forming material contains at least 63.0 wt % of the Si constituent. Thus, by reducing the content of the Sn constituent, it is possible to provide the glaze composition having excellent cost performance.

On the other hand, when the content of the divalent metal constituent is within the range of 16.0 to 20.0 wt %, and the content of the monovalent metal constituent is within the range of 4.0 to 6.0 wt %, it is possible to further improve the antifouling performance and the luster of the glaze layer.

Each of the constituents of the glaze forming material can be provided in the form of an oxide thereof. Alternatively, a raw material containing the constituent in the form other than the oxide may be used to prepare the glaze composition. That is, it is possible to use the raw material satisfying the condition that an oxide of the constituent can be generated in the glaze layer when the constituent in the raw material is oxidized by baking. Concretely, feldspars, silica, limestone, dolomite, zinc oxide, "Gairome" clay and a tin-oxide powder can be used. Therefore, the glaze forming material can be prepared by grinding and mixing required amounts of these materials.

In addition, it is preferred than the glaze forming material contains a frit. For example, the frit can be prepared by melting a mixture of compounds containing the required constituents described above, vitrifying the mixture, and grinding the vitrified (amorphous) material. Of course, the frit prepared by using some of the constituents may be mixed with the remaining constituent(s). The glaze composition can be obtained by mixing the glaze forming material with a required amount of water and a binder, if necessary.

It is preferred to preliminarily control the particle size of the raw material containing the Si or Sn constituent to prepare the glaze forming material. For example, a preliminary grinding step for the raw material containing the Si constituent such as the feldspars or silica may be performed. By classifying a resultant product, a powder not containing particles of more than 30 μm or a slurry thereof can be obtained. In addition, the preliminary grinding step for the raw material containing the Sn constituent such as a tin-oxide powder may be performed. By classifying a resultant product, a powder having of a median diameter of 0.2 to 4.0 μm or a slurry thereof can be obtained. These cases are effective to stably obtain the effects of improving the antifouling performance and the visual beauty of the glaze layer. The median diameter is defined as a particle size corresponding to 50% of a cumulative curve in particle-size distribution, which is also named as 50% average particle size (D50). In the present specification, the median diameter is determined according to the particle-size distribution based on weight. In this case, a total weights of particles having diameters larger than the median diameter is equal to the total weight of the particles having diameters smaller than the median diameter.

In addition, it is preferred that a median diameter of the glaze forming material is within a range of 4 to 5 µm. When the range of median diameter is satisfied, it is possible to further improve the antifouling performance and a degree of luster of the glaze layer.

In the case of preparing the glaze composition of the present invention, it is preferred to preliminarily grind a raw material containing at least one of the Si and Sn constituents to obtain a powder or a slurry, mix raw materials containing the remaining constituents with the powder or the slurry, and grind a resultant mixture to obtain a powder of the glaze forming material having a required particle size or a slurry thereof. When preparing the slurry of the glaze forming material, these grinding steps can be performed in the presence of water.

In the case of preliminarily grinding only the raw material containing the Si constituent, it is preferred to carry out the grinding step to obtain a powder having a median diameter of 5 µm or less or a slurry thereof. Then, the raw materials containing the remaining constituents are mixed with the powder or the slurry. A resultant mixture is ground again to obtain a powder of the glaze forming material having a required particle size or a slurry thereof. In this case, it is possible to further reduce the pore generation amount, and obtain a better visual beauty of the glaze layer. As described above, as the median diameter of the raw material containing the Si constituent becomes smaller, better results are obtained. However, the median diameter of about 1 µm may be suitable from the viewpoint of a reduction in production time.

In the case of preliminarily grinding only the raw material containing the Sn constituent, it is preferred to carry out the grinding step to obtain a powder having a median diameter of 1.5 to 2 µm or a slurry thereof. Then, the raw materials containing the remaining constituents are mixed with the powder or the slurry. A resultant mixture is ground again to obtain a powder of the glaze forming material having a required particle size or a slurry thereof. In this case, it is possible to further improve the antifouling performance, and provide a beautiful semi-opaque glaze layer with good luster. Thus, this preliminary grinding step is particularly effective to improve the appearance of the glaze layer.

In the case of preliminarily grinding the raw materials containing the Si and Sn constituents, it is preferred to carry out the grinding step to obtain a mixed powder having a median diameter of 5 µm or less or a slurry thereof. Then, raw materials containing the remaining constituents with the mixed powder or the slurry. A resultant mixture is ground again to obtain a powder of the glaze forming material having a required particle size or a slurry thereof. In this case, it is possible to further reduce the pore generation amount, and obtain a better visual beauty of the semi-opaque glaze layer. As described above, as the median diameter of the raw materials containing the Si and Sn constituents becomes smaller, better results are obtained. However, the median diameter of about 1 µm may be suitable from the viewpoint of a reduction in production time.

After the preliminary grinding step described above, it is preferred to grind the resultant mixture such that the powder of the glaze forming material has a median diameter of 4 to 5 µm or a slurry thereof. In this range it is effective to further improve the antifouling performance and the visual beauty of the semi-opaque glaze layer with luster.

For example, the grinding step may be performed by means of ball milling. In this case, it is preferred to use alumina or silica balls for ball milling and/or a ball-mill pot having a liner made of alumina or silica. These are useful to prevent contamination of the glaze forming material. In particular, since alumina is excellent in wear resistance, it is possible to minimize a situation that broken pieces of the balls are mixed with the glaze forming material during the ball-milling step. As a consequence, it leads to excellent antifouling performance of the glaze layer. From these reasons, it is recommended to use the balls and liner of alumina.

To improve the easiness of applying the glaze composition, it is preferred that the glaze composition contains water. For example, about 40 parts by weight of water may be used with respect to 100 parts by weight of solid matter in the glaze composition. To enhance the film formation capability of the glaze composition, the glaze composition may contain a binder, which can be vaporized during the baking. The kind of the binder can be optionally selected.

In the case of forming the glaze layer having a desired color other than semi-opaque, the glaze composition can contain a pigment for providing the desired color to the glaze layer. The kind of the pigment can be optionally selected. However, it is preferred to use the pigment, which is not crystallized when the glaze layer is formed.

Another important purpose of the present invention is to provide an antifouling ceramic ware having the glaze layer, which is formed by use of the glaze composition of the present invention. That is, the antifouling ceramic ware can be produced according to the following steps. First, the glaze composition explained above is applied on a required surface of a dried article made of a base material for ceramic wares. For example, the glaze composition may be spayed on the article. Next, the applied layer is baked at a temperature of 1150 to 1250° C. for 8 hours or more to form the glaze layer on the surface of the baked article. When the temperature is less than 1150° C., the antifouling performance of the glaze layer may deteriorate, and the degree of luster of the glaze layer may decrease. On the other hand, when the temperature is more than 1250° C., there is a case that the fluidity of the glaze composition of the applied layer increases, and variations in thickness of the glaze layer become wide. When the baking temperature is within the above range, it is possible to stably obtain the glaze layer with good luster and excellent antifouling performance. As the baking time is longer than 8 hours, the pore reduction amount in the glaze layer reduces. However, it is preferred to select the baking time less than 24 hours from the viewpoint of a reduction in production cost.

To bake the glaze composition, for example, a roller-heath type furnace or a tunnel kiln can be used. In the roller-heath type furnace, plural rollers for traveling the articles to be baked are arranged. On the other hand, in the tunnel kiln, cars carrying the articles to be baked are movable. In these cases, since large amounts of the articles can be successively baked, it is possible to obtain a high production efficiency. When using the roller-heath type furnace, it is preferred to bake the articles for 8 hours or more. When using the tunnel kiln, it is preferred to bake the article for 10 hours or more.

In the above production method, it is preferred that the glaze composition is applied on the required surface of the article such that a thickness of the glaze layer after baking is within a range of 0.2 to 1.2 mm. In this range, the surface of the article can be concealed behind the glaze layer. When the thickness is less than 0.2 mm, the surface of the article may become visible through the glaze layer. On the other hand, when the thickness is more than 1.2 mm, fine cracks may easily develop when the applied layer of the glaze composition is dried before the baking step. In such a case, there is a fear that a defect that is the so-called "parting" occurs in the glaze layer after the baking step, and the surface of the article is partially exposed outside.

By analyzing the glaze layer of the present invention with an X-ray diffraction analysis method after the baling step, diffraction peaks resulting from $SnO_2$ and/or $CaSnSiO_5$ (tin sphene) crystals can be detected. That is, no diffraction peak resulting from crystals other than $SnO_2$ and $CaSnSiO_5$ crystals can be detected. It means that most of the constituents of the glaze composition makes an amorphous structure. The color (semi-opaque) of the glaze layer is provided by the presence of the $SnO_2$ and $CaSnSiO_5$ crystals. Since the glaze composition of the present invention does not contain zirconium constituent, it is possible to provide a smooth surface with luster of the glaze layer and excellent antifouling performance without surface unevenness of the glaze layer, which is caused by the generation of zirconium silicate ($ZrSiO_4$) crystals.

EXAMPLES

Next, preferred examples of the present invention are described in detail.

Example 1

As raw materials of a glaze forming material of the present invention, "Kamato" feldspar, silica powder, lime stone, dolomite, zinc oxide, "Gairome" clay and a tin-oxide powder were used. A content of particles of 30 µm or more in each of the silica powder and "Gairome" clay is about 2%. The silica powder and "Gairome" clay are the raw materials containing the Si constituent. A median diameter of the tin-oxide powder is 4.1 µm.

A required amounts of the raw materials was put in a ball-mill pot having a silica liner, and then 40 parts by weight of water was added to the pot with respect to 100 parts by weight of solid matter of the raw materials. A resultant mixture was ball-milled for 8 hours by use of the ball-mill pot and silica balls. As a consequence, a glaze composition of Example 1 was obtained. The composition "A" of a glaze forming material of the obtained glaze composition is shown in Table 1 by oxide conversion. The median diameter of the glaze forming material in the glaze composition was measured by use of an X-ray transmission-type particle-size measuring instrument. In Example 1, the median diameter is 5.1 µm.

Subsequently, this glaze composition was sprayed on a surface of an article of a base material for ceramic sanitary wares to form a layer of the glaze composition thereon. The ceramic ware with the sprayed layer was baked at the maximum temperature of 1200° C. for 16 hours in a tunnel kiln to obtain a baked article having a glaze layer of 0.6 mm thickness as the ceramic sanitary ware of Example 1.

Examples 2 to 9, Comparative Examples 1 to 13

In each of Examples 2 to 9 and Comparative Examples 1 to 13, a glaze composition was prepared according to a substantially same method as Example 1 except that different additive amounts of the raw materials were used, and the ball-milling step was performed under a different condition such that a glaze forming material has the median diameter of 5.1 µm. The compositions "B" to "V" of glaze forming materials of the glaze compositions obtained in Examples 2 to 9 and Comparative Examples 1 to 13 are shown in Tables 1 and 2 by oxide conversion.

Subsequently, the glaze composition was sprayed on a surface of an article of a base material for ceramic sanitary wares to form a layer of the glaze composition thereon. The ceramic ware with the sprayed layer was baked under the same baking conditions as Example 1 to obtain a baked article having a glaze layer of 0.6 mm thickness as the ceramic sanitary ware.

Examples 10, 11

In each of Examples 10 and 11, 30 parts by weight of a glass frit powder (manufactured by Japan Frit Company; Product Number PN-54321; $SiO_2$: 70 wt %, $Al_2O_3$; 14 wt %, $Na_2O$: 16 wt %) was added to 70 parts by weight of the other raw materials. A resultant mixture was ball-milled by use of the same ball-mill pot and balls as Example 1 to obtain a glaze forming material having the median diameter of 5.1 µm. The compositions "A" and "B" of the glaze forming materials of Examples 10 and 11 are shown in Table 1 by oxide conversion.

Subsequently, the glaze composition was sprayed on a surface of an article of a base material for ceramic sanitary wares to form a layer of the glaze composition thereon. The ceramic ware with the sprayed layer was baked under the same baking conditions as Example 1 to obtain a baked article having a glaze layer of 0.6 mm thickness as the ceramic sanitary ware.

Examples 12, 13

In these Examples, raw materials of the "Kamato" feldspar and silica powder were preliminarily grounded and classified to remove large particles of 30 µm or more therefrom. Except for the above step, glaze compositions of Examples 12 and 13 were prepared according to the substantially same methods as Example 1 or 2, respectively. The obtained glaze composition contains a glaze forming material having the median diameter of 5.1 µm. The compositions "A" and "B" of the glaze forming materials of Examples 12 and 13 are shown in Table 1 by oxide conversion.

Next, the glaze composition was sprayed on a surface of an article of a base material for ceramic sanitary wares to form a layer of the glaze composition thereon. The ceramic ware with the sprayed layer was baked under the same baking conditions as Example 1 to obtain a baked article having a glaze layer of 0.6 mm thickness as the ceramic sanitary ware.

Examples 14 to 17

In each of Examples 14 and 15, a glaze composition was prepared according to the substantially same method as Example 3 except that a tin-oxide powder having a median diameter of 3.2 µm (Example 14) or 0.1 µm (Example 15) was used as the raw material containing Sn constituent, as shown in Table 3. The obtained glaze composition contains a glaze forming material having the median diameter of 5.1 µm. The composition "C" of the glaze forming material of Examples 14 and 15 is shown in Table 1 by oxide conversion.

In each of Examples 16 and 17, a glaze composition was prepared according to the substantially same method as Example 4 except that a tin-oxide powder having a median diameter of 3.2 µm (Example 16) or 0.1 µm (Example 17)

was used as the raw material containing Sn constituent, as shown in Tables 3 and 4. The obtained glaze composition contains a glaze forming material having the median diameter of 5.1 µm. The composition "D" of the glaze forming material of Examples 16 and 17 is shown in Table 1 by oxide conversion.

Next, the glaze composition was sprayed on a surface of an article of a base material for ceramic sanitary wares to form a layer of the glaze composition thereon. The ceramic ware with the sprayed layer was baked under the same baking conditions as Example 1 to obtain a baked article having a glaze layer of 0.6 mm thickness as the ceramic sanitary ware.

Examples 18, 19

In each of Examples 18 and 19, a glaze composition was prepared according to the substantially same method as Example 2 except that the median diameter of the glaze forming material was adjusted to 4.3 µm (Example 18) or 3.8 µm (Example 19) by controlling the ball-milling time, as shown in Table 4. The composition "B" of the glaze forming material of Examples 18 and 19 is shown in Table 1 by oxide conversion.

Next, the glaze composition was sprayed on a surface of an article of a base material for ceramic sanitary wares to form a layer of the glaze composition thereon. The ceramic ware with the sprayed layer was baked under the same baking conditions as Example 1 to obtain a baked article having a glaze layer of 0.6 mm thickness as the ceramic sanitary ware.

Examples 20 to 22

One (Examples 20, 21) or both (Example 22) of raw materials containing Si and Sn constituents was mixed with 20 parts by weight of water to obtain a first mixture, and then the first mixture was preliminarily ball-milled for 1 hour by use of the same ball-mill pot and balls as Example 1, so that the median diameters of these raw materials became the values shown in Table 4. The remaining raw materials and water were added into the pot having the first mixture therein, and a resultant mixture was ball-milled to obtain a glaze composition. A content of water is 40 parts by weight with respect to 100 parts by weight of the solid matter of the raw materials. The obtained glaze composition contains a glaze forming material having the median diameter of 5.1 µm. The composition "B" of the glaze forming material of Examples 20 to 22 is shown in Table 1 by oxide conversion.

Next, the glaze composition was sprayed on a surface of an article of a base material for ceramic sanitary wares to form a layer of the glaze composition thereon. The ceramic ware with the sprayed layer was baked under the same baking conditions as Example 1 to obtain a baked article having a glaze layer of 0.6 mm thickness as the ceramic sanitary ware.

Example 23

A raw material containing Si constituent was mixed with 20 parts by weight of water to obtain a first mixture, and then the first mixture was preliminarily ball-milled for 4 hours by use of the same ball-mill pot and balls as Example 1, so that the median diameters of the raw material became 5.0 µm. The remaining raw materials and water were added into the pot having the first mixture therein, and then a resultant mixture was ball-milled for 7 hours to obtain a glaze composition. A content of water is 40 parts by weight with respect to 100 parts by weight of the solid matter of the raw materials. The obtained glaze composition contains a glaze forming material having the median diameter of 4.4 µm. The composition "B" of the glaze forming material of Examples 23 is shown in Table 1 by oxide conversion.

Next, the glaze composition was sprayed on a surface of an article of a base material for ceramic sanitary wares to form a layer of the glaze composition thereon. The ceramic ware with the sprayed layer was baked under the same baking conditions as Example 1 to obtain a baked article having a glaze layer of 0.6 mm thickness as the ceramic sanitary ware.

Examples 24 and 25

In each of Examples 24 and 25, a raw material containing Sn constituent was mixed with 20 parts by weight of water to obtain a first mixture, and then the first mixture was preliminarily ball-milled for 3 hours (Example 24) or 6 hours (Examples 25) by use of the same ball-mill pot and balls as Example 1, so that the median diameters of the raw material became 1.8 µm (Example 24) or 1.3 µm (Example 25). The remaining raw materials and water were added into the pot having the first mixture therein, and then a resultant mixture was ball-milled for 7 hours to obtain a glaze composition. A content of water is 40 parts by weight with respect to 100 parts by weight of the solid matter of the raw materials. The obtained glaze composition contains a glaze forming material having the median diameter of 4.9 µm. The composition "B" of the glaze forming material of Examples 24 and 25 is shown in Table 1 by oxide conversion.

Next, the glaze composition was sprayed on a surface of an article of a base material for ceramic sanitary wares to form a layer of the glaze composition thereon. The ceramic ware with the sprayed layer was baked under the same baking conditions as Example 1 to obtain a baked article having a glaze layer of 0.6 mm thickness as the ceramic sanitary ware.

Example 26

Both of raw materials containing Si and Sn constituent were mixed with 20 parts by weight of water to obtain a first mixture, and then the first mixture was preliminarily ball-milled for 4 hours by use of the same ball-mill pot and balls as Example 1, so that the median diameters of the raw material became 5.0 µm. The remaining raw materials and water were added into the pot having the first mixture therein, and then a resultant mixture was ball-milled for 7 hours to obtain a glaze composition. A content of water is 40 parts by weight with respect to 100 parts by weight of the solid matter of the raw materials. The obtained glaze composition contains a glaze forming material having the median diameter of 4.1 µm. The composition "B" of the glaze forming material of Example 26 is shown in Table 1 by oxide conversion.

Next, the glaze composition was sprayed on a surface of an article of a base material for ceramic sanitary wares to form a layer of the glaze composition thereon. The ceramic ware with the sprayed layer was baked under the same baking conditions as Example 1 to obtain a baked article having a glaze layer of 0.6 mm thickness as the ceramic sanitary ware.

Examples 27, 28

In each of these Examples, a glaze composition was prepared according to the same method as Example 2 except for the following features. That is, in Example 27, a ball-mill pot having a silica liner and alumina balls were used for the ball-milling step. On the other hand, in Example 28, a ball-mill pot having a alumina liner and alumina balls were used for the ball-milling step. The obtained glaze composition contains a glaze forming material having the median diameter of 5.1 μm. The composition "B" of the glaze forming material of Examples 27 and 28 is shown in Table 1 by oxide conversion.

Next, the glaze composition was sprayed on a surface of an article of a base material for ceramic sanitary wares to form a layer of the glaze composition thereon. The ceramic ware with the sprayed layer was baked under the same baking conditions as Example 1 to obtain a baked article having a glaze layer of 0.6 mm thickness as the ceramic sanitary ware.

Example 29, Comparative Example 14

In Example 29, 3 parts by weight of a pigment (manufactured by Kawamura Chemical Co., Ltd.; "GLAY 6501") was further added to the glaze composition of Example 2. On the other hand, in Comparative Example 14, 3 parts by weight of the above pigment was further added to the glaze composition of Comparative Example 1. The obtained glaze composition contains a glaze forming material having the median diameter of 5.1 μm.

Next, each of the glaze compositions was sprayed on a surface of an article of a base material for ceramic sanitary wares to form a layer of the glaze composition thereon. The ceramic ware with the sprayed layer was baked under the same baking conditions as Example 1 to obtain a baked article having a glaze layer of 0.6 mm thickness as the ceramic sanitary ware.

With respect to each of the Examples 1 to 29 and Comparative Examples 1 to 14, the following evaluations were carried out. Results are shown in Table 3 to 5.

(1) Antifouling Performance of the Glaze Layer

After the ceramic ware with the glaze layer was kept in a 5% alkali aqueous solution at the temperature of 60° C. for 45 hours, it was contaminated by a water-base paint. Then, it was tried to remove the contamination from the ceramic ware with wastes. In Table 3 to 5, the symbol "⊚" designates that the contamination was completely removed. The symbol "○" designates that the contamination was almost removed, but there was a case that a small amount of the contamination remained on the ceramic ware. The symbol "X" designates that the remaining contamination was visually identified.

(2) Degree of Luster of the Glaze Layer

The degree of luster of the glaze layer was visually compared with the glaze layer of Comparative Example 1. In Tables 3 to 5, the symbol "⊚" designates that the luster is better than that of Comparative Example 1. The symbol "○" designates that the luster is substantially the same as that of Comparative Example 1. The symbol "X" designates that the luster is poorer than that of Comparative Example 1.

(3) Pore Generation Amount in the Glaze Layer

The pore generation amount of the glaze layer was visually compared with that of Comparative Example 1. In Tables 3 to 5, the symbol "⊚" designates that the pore generation amount is smaller than that of Comparative Example 1. The symbol "○" designates that the pore generation amount is substantially the same as that of Comparative Example 1. The symbol "X" designates that the pore generation amount is larger than that of Comparative Example 1.

(4) Degree of Semi-Opaque of the Glaze Layer

The degree of semi-opaque of the glaze layer was visually compared with that of Comparative Example 1. In Tables 3 to 5, the symbol "⊚" designates that the degree of semi-opaque of the glaze layer is better than that of Comparative Example 1. The symbol "○" designates that the degree of semi-opaque of the glaze layer is substantially the same as that of Comparative Example 1. The symbol "X" designates that the degree of semi-opaque of the glaze layer is worse than that of Comparative Example 1.

The results of Examples 1 to 9 indicates that the present invention can provide the glaze layer having improved antifouling performance without deteriorating the degrees of luster and semi-opaque of the glaze layer and increasing the pore generation amount, as compared with the glaze layer of the Comparative Example 1. Since the glaze layer of Comparative Example 1 contains $ZrSiO_4$, it demonstrated poor antifouling performance.

In Comparative Examples 2 and 11, since the glaze layer contains an excessive amount of the Si constituent, the antifouling performance deteriorated and the pore generation amount increased. On the other hand, in Comparative Example 3, since the content of the Sn constituent in the glaze layer is not sufficient, the visual beauty of the semi-opaque glaze layer decreased. In addition, the antifouling performance deteriorated, and the pore generation amount increased.

In Comparative Examples 11 and 13, since the glaze layer contains an excessive amount of the Al constituent, the degree of semi-opaque of the glaze layer decreased. On the other hand, in Comparative Examples 2 and 10, since the content of the Al constituent in the glaze layer is not sufficient, the antifouling performance deteriorated, and the pore generation amount increased.

In Comparative Example 3, since the glaze layer contains an excessive amount of the Sn constituent, the antifouling performance deteriorated. On the other hand, in Comparative Example 12, since the content of the Sn constituent in the glaze layer is not sufficient, the degree of semi-opaque of the glaze layer decreased.

In Comparative Example 7, since the glaze layer contains an excessive amount of the divalent metal constituent, the antifouling performance deteriorated, and the pore generation amount increased. On the other hand, in Comparative Examples 6 and 11, since the content of the divalent metal constituent in the glaze layer is not sufficient, the degree of luster of the glaze layer decreased, and the antifouling performance deteriorated.

In Comparative Examples 4 and 8, since the glaze layer contains an excessive amount of the monovalent metal constituent, the antifouling performance deteriorated, and the pore generation amount increased. In addition, the occurrence of cracking in the glaze layer was observed. On the other hand, in Comparative Examples 5 and 9, since the content of the monovalent metal constituent in the glaze layer is not sufficient, the degree of luster of the glaze layer decreased, and the antifouling performance deteriorated.

When the total amounts of the divalent metal constituents by oxide conversion in the glaze layer is 16 wt % or more, there was a tendency that the improvement of antifouling performance is facilitated. On the other hand, when the total amounts of the divalent metal constituents is 20 wt % or less, the pore generation amount was remarkably reduced.

In Examples 10 and 11 using the frit, the same evaluation results as the cases of Examples 1 and 2 were obtained. Additionally, in Examples 12 and 13 that the particles of 30 μm or more were preliminarily removed from the raw material containing the Si constituent, the antifouling performance was further improved, as compared with the cases of Examples 1 and 2, which are of the same compositions as the Examples 12 and 13.

In Examples 14 and 16 having the median diameter of the raw material containing the Sn constituent within the range of 0.2 to 4.0 μm, the antifouling performance was further improved, as compared with the cases of Examples 3 and 4, which are of the same compositions as the Examples 14 and 16. On the other hand, in Examples 15 and 17 having the median diameter of 0.2 μm or less, the antifouling performance was substantially equal to the cases of Examples 3 and 4, which are of the same compositions as the Examples 15 and 17. The degree of semi-opaque of the glaze layer of Examples 3 and 4 was better than that of Examples 15 and 17.

In Example 18 having the median diameter of the glaze forming material within the range of 4.0 to 5.0 μm, the antifouling performance was further improved, as compared with the case of Example 2, which is of the same composition as the Examples 18. On the other hand, in Example 19 having the median diameter of 4.0 μm or less, the antifouling performance was substantially equal to the case of Example 2.

In Examples 20 to 26 that at least one of the raw materials containing the Si and Sn constituents was preliminarily grounded, the antifouling performance was further improved, as compared with the case of Example 2, which is of the same composition as the those Examples. In particular, with respect to Examples 23 to 26, since the median diameter of the glaze forming material is within the more preferred range, the degree of luster of the glaze layer was remarkably improved. In addition, in Examples 24 and 26 that the raw material containing the Sn constituent was preliminarily grounded, the degree of semi-opaque of the glaze layer was further improved.

In both of Example 27 using the alumina balls, and Example 28 using the ball-mill pot with the alumina liner and the alumina balls, better antifouling performance was obtained, as compared with the case of Example 2, which is of the same composition as the Examples 27 and 28. In addition, the antifouling performance of the glaze layer of Example 28 was better than that of Example 27.

In Example 29 using the glaze composition containing the pigment, a colored glaze layer other than semi-opaque was obtained. The glaze layer of this Example demonstrated substantially same evaluation results as that of Example 2, which is of the same composition as the case of Example 29 except that the pigment was not added. In addition, the antifouling performance was much better than that of Comparative Example 14 containing the pigment.

Figure 1B:
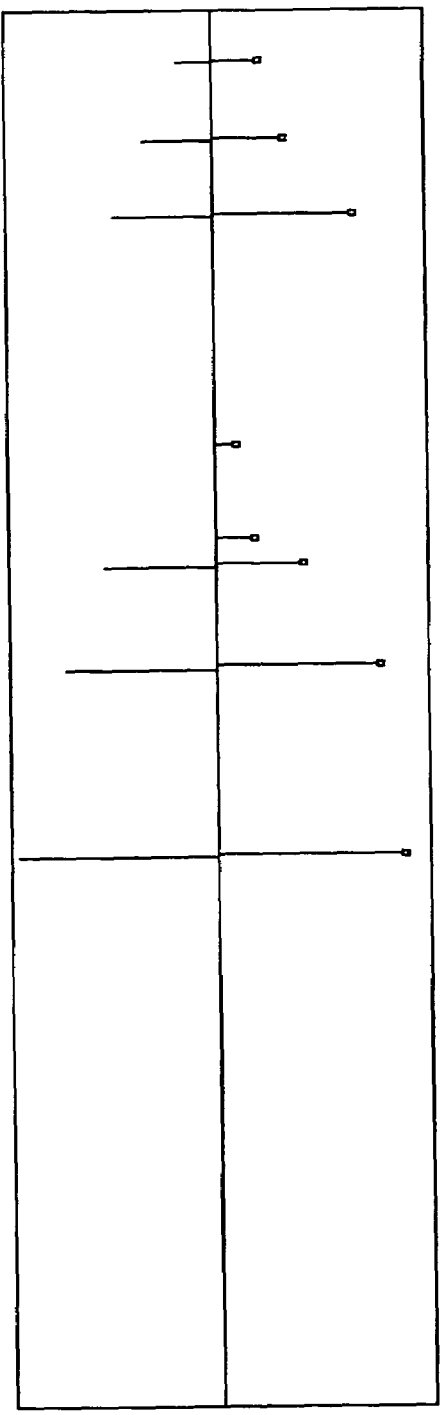
FIG. 1B is a diagram showing a relation between the X-ray diffraction profile of FIG. 1A and an X-ray diffraction profile of $SnO_2$ crystal obtained by simulation.
Figure 2A:
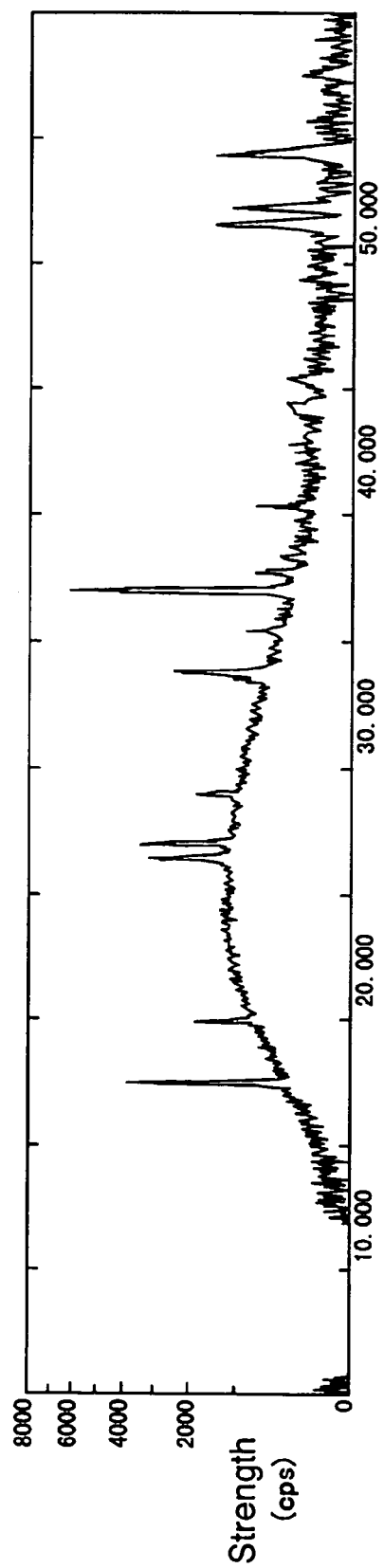
FIG. 2A is an X-ray diffraction profile of a glaze layer of Example 2.
Figure 2B:
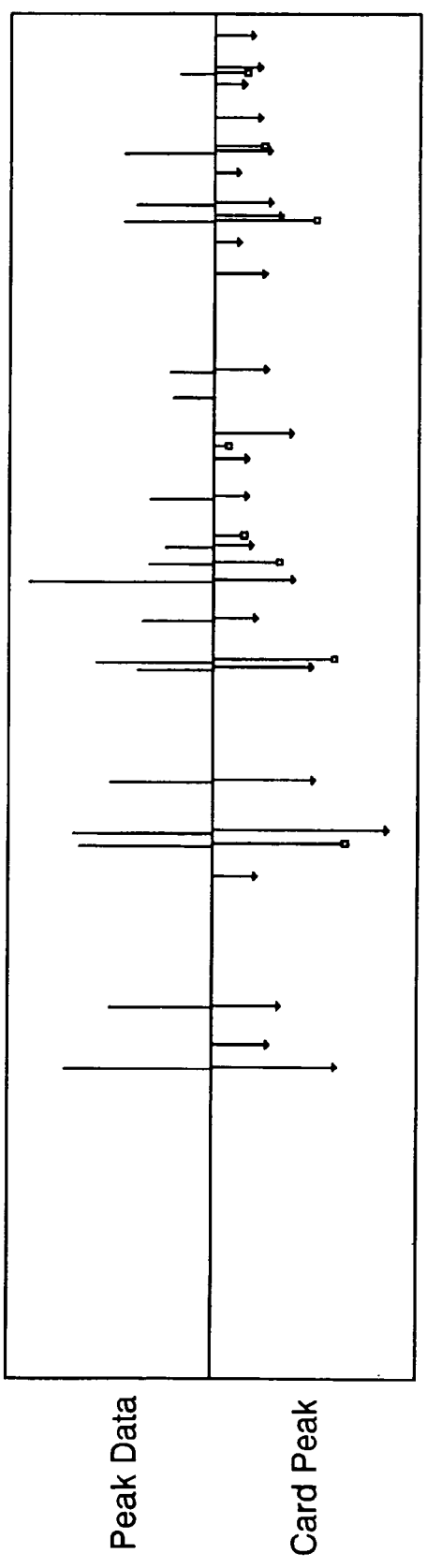
FIG. 2B is a diagram showing a relation between the X-ray diffraction profile of FIG. 2A and an X-ray diffraction profile of $SnO_2$ and $SnSiO_6$ crystals obtained by simulation.

With respect to the glaze composition of Examples 1 and 2 and Comparative Example 1, an X-ray diffraction analysis was performed by use of CuKα ray as the X-ray source. Results are shown in FIGS. 1A, 1B, 2A, 2B, 3A and 3B. FIGS. 1A, 2A and 3A are measured X-ray diffraction profiles of the Examples 1 and 2 and Comparative Example 1, respectively. The horizontal axis shows X-ray diffraction angle (2θ), and the vertical axis shows diffraction strength. In FIGS. 1B, 2B and 3B, the term "peak data" shows a relation between the diffraction angle and the diffraction strength, which are determined from the measured profile of each of FIGS. 1A, 2A and 3A. The "card peak" shows the relation between the diffraction angle and the diffraction strength, which are determined from simulation results with respect to $SnO_2$ crystal (FIG. 1B), $SnO_2$ and $SnSiO_6$ crystals (FIG. 2B), and zirconium silicate (FIG. 3B).

As understood from these figures, the glaze layer of Example 1 has only diffraction peaks resulting from $SnO_2$ crystal. The remaining constituents are in amorphous state. Thus, when only $SnO_2$ is contained in the form of crystal in the glaze layer, a beautiful semi-opaque glaze layer with luster, smooth surface and good antifouling performance can be obtained.

On the other hand, the glaze layer of Example 2 has only diffraction peaks resulting from $CaSnSiO_5$ and $SnO_2$ crystals. The remaining constituents are in amorphous state. Thus, when only $CaSnSiO_5$ and $SnO_2$ are contained in the form of crystals in the glaze layer, a beautiful semi-opaque glaze layer with luster, smooth surface, and good antifouling performance can be obtained.

On the contrary, zirconium silicate crystals were generated in the glaze layer of Comparative Example 1. In this case, a beautiful semi-opaque glaze layer can be obtained. However, as understood from the above evaluations, considerable surface unevenness of the glaze layer occurs, and the antifouling performance was poor.

As described above, a beautiful semi-opaque glaze layer with good luster and excellent antifouling performance can be obtained by use of the glaze composition of the present invention. Even when a dirt deposits on the glaze layer, the dirt can be easily removed from the glaze layer. In addition, the use of the glaze composition of the present invention stably provides a smooth surface of the glaze layer, and a reduction in pore generation amount in the glaze layer. Moreover, when the glaze layer having a desired color other than semi-opaque is needed, it is possible to readily provide a beautiful glaze layer having the desired color and excellent antifouling performance by use of the glaze composition of the present invention containing a required amount of the pigment.

In addition, an antifouling ceramic ware having the semi-opaque glaze layer with good luster and excellent antifouling performance can be produced by forming a layer of the glaze composition of the present invention on a surface of an article of a base material for ceramic wares, and baking the layer at a temperature of 1150 to 1250° C. for 8 hours or more to obtain a glaze layer on the surface of the baked article.

Thus, since the glaze composition of the present invention can present excellent antifouling performance and beautiful appearance to the ceramic wares, it will be preferably used in wide application areas of ceramics for home use, industry and architecture as well as artistic ceramics, and particularly in the application areas of ceramic sanitary wares.

TABLE 1

| | Composition (parts by weight) | | | | | | | | |
|---|---|---|---|---|---|---|---|---|---|
| | A | B | C | D | E | F | G | H | I |
| $SiO_2$ | 60.0 | 65.5 | 67.0 | 55.2 | 58.9 | 60.0 | 62.3 | 58.2 | 62.8 |
| $Al_2O_3$ | 10.0 | 9.0 | 8.0 | 11.0 | 9.5 | 9.7 | 10.1 | 9.4 | 9.6 |
| $R_2O$ | | | | | | | | | |
| $K_2O$ | 2.0 | 2.5 | 2.4 | 2.8 | 3.5 | 2.0 | 2.4 | 2.2 | 2.7 |
| $Na_2O$ | 2.0 | 2.5 | 2.2 | 2.5 | 2.3 | 2.0 | 2.2 | 1.9 | 2.5 |
| Total of $R_2O$ | 4.0 | 5.0 | 4.6 | 5.3 | 5.8 | 4.0 | 4.6 | 4.1 | 6.2 |
| RO | | | | | | | | | |
| CaO | 10.0 | 11.8 | 11.6 | 11.7 | 9.9 | 10.1 | 9.2 | 9.8 | 11.8 |
| ZnO | 8.0 | 6.1 | 6.0 | 8.3 | 7.7 | 7.9 | 5.9 | 10.5 | 5.7 |

TABLE 1-continued

| | Composition (parts by weight) | | | | | | | | |
|---|---|---|---|---|---|---|---|---|---|
| | A | B | C | D | E | F | G | H | I |
| MgO | 0.7 | 0 | 0 | 0.7 | 0.7 | 0.7 | 0 | 0.7 | 0 |
| BaO | 0 | 0 | 0 | 0 | 0 | 0 | 0 | 0 | 0 |
| Total of RO | 19.0 | 18.0 | 17.6 | 20.7 | 18.3 | 18.7 | 15.1 | 21.0 | 17.5 |

TABLE 1-continued

| | Composition (parts by weight) | | | | | | | | |
|---|---|---|---|---|---|---|---|---|---|
| | A | B | C | D | E | F | G | H | I |
| $SnO_2$ | 7.0 | 2.5 | 2.8 | 7.8 | 7.5 | 7.6 | 7.9 | 7.4 | 4.9 |
| $ZrO_2$ | 0 | 0 | 0 | 0 | 0 | 0 | 0 | 0 | 0 |

TABLE 2

| | Composition (parts by weight) | | | | | | | | | | | |
|---|---|---|---|---|---|---|---|---|---|---|---|---|
| | J | K | L | M | N | O | P | Q | R | S | T | U | V |
| $SiO_2$ | 65.0 | 67.6 | 54.5 | 58.7 | 60.1 | 63.0 | 57.9 | 65.5 | 66.2 | 64.2 | 68.0 | 66.4 | 58.7 |
| $Al_2O_3$ | 8.0 | 7.9 | 11.3 | 9.5 | 9.7 | 10.2 | 9.3 | 9.0 | 9.5 | 7.9 | 12.0 | 9.4 | 11.2 |
| $R_2O$ | | | | | | | | | | | | | |
| $K_2O$ | 3.0 | 2.4 | 2.8 | 3.9 | 1.9 | 2.4 | 2.2 | 3.2 | 1.9 | 2.4 | 2.0 | 2.5 | 2.4 |
| $Na_2O$ | 1.0 | 2.2 | 2.5 | 2.3 | 1.9 | 2.1 | 1.9 | 2.9 | 2.0 | 2.3 | 2.0 | 2.3 | 2.2 |
| Total of $R_2O$ | 4.0 | 4.6 | 5.3 | 6.2 | 3.8 | 4.5 | 4.1 | 6.1 | 3.9 | 4.7 | 4.0 | 4.8 | 4.6 |
| RO | | | | | | | | | | | | | |
| CaO | 11.0 | 11.4 | 11.8 | 9.9 | 10.1 | 9.3 | 9.7 | 11.1 | 11.5 | 11.4 | 11.0 | 11.5 | 10.9 |
| ZnO | 3.0 | 6.9 | 8.3 | 7.7 | 7.9 | 4.5 | 11.0 | 4.1 | 2.8 | 4.9 | 3.0 | 4.9 | 9.2 |
| MgO | 1.0 | 0 | 0.7 | 0.7 | 0.7 | 0.6 | 0.7 | 0 | 0 | 0 | 0 | 0 | 0.7 |
| BaO | 0 | 0 | 0 | 0 | 0 | 0 | 0 | 0 | 3.0 | 0.8 | 0 | 0.9 | 0 |
| Total of RO | 15.0 | 17.3 | 20.8 | 18.3 | 18.7 | 14.4 | 21.4 | 15.2 | 17.3 | 17.1 | 14.0 | 17.3 | 20.8 |
| $SnO_2$ | 0 | 2.6 | 8.1 | 7.5 | 7.6 | 8.0 | 7.4 | 4.0 | 2.8 | 6.0 | 2.0 | 1.9 | 4.6 |
| $ZrO_2$ | 8.0 | 0 | 0 | 0 | 0 | 0 | 0 | 0 | 0 | 0 | 0 | 0 | 0 |

TABLE 3

| | EXAMPLE | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Glaze composition | A | B | C | D | E | F | G | H | I | A | B | A | B | C | C | D |
| Frit (wt %) | | | | Not used | | | | | | 30 | 30 | | | Not used | | |
| Content (wt %) of particles (more than 30 μm) in $SiO_2$ raw material | 2 | 2 | 2 | 2 | 2 | 2 | 2 | 2 | 2 | 2 | 2 | 0 | 0 | 2 | 2 | 2 |
| Particle size of $SnO_2$ raw material (μm) | 4.1 | 4.1 | 4.1 | 4.1 | 4.1 | 4.1 | 4.1 | 4.1 | 4.1 | 4.1 | 4.1 | 4.1 | 4.1 | 3.2 | 0.1 | 3.2 |
| Preliminary grinding | | | | | | | | | Not performed | | | | | | | |
| Particle size after preliminary grinding (μm) | — | — | — | — | — | — | — | — | — | — | — | — | — | — | — | — |
| Particle size of glaze forming material (μm) | 5.1 | 5.1 | 5.1 | 5.1 | 5.1 | 5.1 | 5.1 | 5.1 | 5.1 | 5.1 | 5.1 | 5.1 | 5.1 | 5.1 | 5.1 | 5.1 |
| Liner material of ball-mill pot | | | | | | | | | Silica | | | | | | | |
| Ball material | | | | | | | | | Silica | | | | | | | |
| Content of pigment | | | | | | | | | Not used | | | | | | | |
| Antifouling performance | ○ | ○ | ○ | ○ | ○ | ○ | ○ | ○ | ○ | ○ | ○ | ⊙ | ⊙ | ⊙ | ○ | ⊙ |
| Luster of glaze layer | ○ | ○ | ○ | ○ | ○ | ○ | ○ | ○ | ○ | ○ | ○ | ○ | ○ | ○ | ○ | ○ |
| Pore generation amount | ○ | ○ | ○ | ○ | ○ | ○ | ○ | ○ | ○ | ○ | ○ | ○ | ○ | ○ | ○ | ○ |
| Color (semi-opaque) of glaze layer | ○ | ○ | ○ | ○ | ○ | ○ | ○ | ○ | ○ | ○ | ○ | ○ | ○ | ○ | ○ | ○ |

TABLE 4

| | EXAMPLE | | | | | | | | | | | | |
|---|---|---|---|---|---|---|---|---|---|---|---|---|---|
| | 17 | 18 | 19 | 20 | 21 | 22 | 23 | 24 | 25 | 26 | 27 | 28 | 29 |
| Glaze composition Frit (wt %) | D | B | B | B | B | B | B | B | B | B | B | B | B |
| | | | | | | Not used | | | | | | | |
| Content (wt %) of particles (more than 30 μm) in $SiO_2$ raw material | 2 | 2 | 2 | 2 | 2 | 2 | 2 | 2 | 2 | 2 | 2 | 2 | 2 |
| Particle size of $SnO_2$ raw material (μm) | 0.1 | 4.1 | 4.1 | 4.1 | 4.1 | 4.1 | 4.1 | 4.1 | 4.1 | 4.1 | 4.1 | 4.1 | 4.1 |
| Preliminary grinding | Not performed | Not performed | $SnO_2$ | $SiO_2$ | $SiO_2$ / $SnO_2$ | $SiO_2$ | $SnO_2$ | $SnO_2$ | $SiO_2$ / $SnO_2$ | | Not performed | Not performed | Not performed |
| Particle size after preliminary grinding (μm) | — | — | — | 3.2 | 8.0 | 7.9 | 5.0 | 1.8 | 1.3 | 5.0 | — | — | — |
| Particle size of glaze forming material (μm) | 5.1 | 4.3 | 3.8 | 5.1 | 5.1 | 5.1 | 4.4 | 4.9 | 4.9 | 4.1 | 5.1 | 5.1 | 5.1 |
| Liner material of ball-mill pot | | | | | | Silica | | | | | Silica | Alumina | Silica |
| Ball material | | | | | | Silica | | | | | Alumina | Alumina | Silica |
| Content of pigment (parts by weight) | | | | | | | Not used | | | | | | 3 |
| Antifouling performance | ○ | ⊚ | ○ | ⊚ | ⊚ | ⊚ | ⊚ | ⊚ | ⊚ | ⊚ | ⊚ | ⊚ | ○ |
| Luster of glaze layer | ○ | ⊚ | ○ | ○ | ○ | ○ | ⊚ | ⊚ | ⊚ | ⊚ | ○ | ○ | ○ |
| Pore generation amount | ○ | ○ | ○ | ○ | ○ | ○ | ○ | ○ | ○ | ○ | ○ | ○ | ○ |
| Color (semi-opaque) of glaze layer | ○ | ○ | ○ | ○ | ○ | ○ | ○ | ⊚ | ⊚ | ⊚ | ○ | ○ | ○ |

TABLE 5

| | COMPARATIVE EXAMPLE | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Glaze composition Frit (wt %) | J | K | L | M | N | O | P | Q | R | S | T | U | V | J |
| | | | | | | | Not used | | | | | | | |
| Content (wt %) of particles (more than 30 μm) in $SiO_2$ raw material | 2 | 2 | 2 | 2 | 2 | 2 | 2 | 2 | 2 | 2 | 2 | 2 | 2 | 2 |
| Particle size of $SnO_2$ raw material (μm) | 4.1 | 4.1 | 4.1 | 4.1 | 4.1 | 4.1 | 4.1 | 4.1 | 4.1 | 4.1 | 4.1 | 4.1 | 4.1 | 4.1 |
| Preliminary grinding | | | | | | | Not performed | | | | | | | |
| Particle size after preliminary grinding (μm) | — | — | — | — | — | — | — | — | — | — | — | — | — | — |
| Particle size of glaze forming material (μm) | 5.1 | 5.1 | 5.1 | 5.1 | 5.1 | 5.1 | 5.1 | 5.1 | 5.1 | 5.1 | 5.1 | 5.1 | 5.1 | 5.1 |
| Liner material of ball-mill pot | | | | | | | Silica | | | | | | | |
| Ball material | | | | | | | Silica | | | | | | | |
| Content of pigment (parts by weight) | | | | | | | Not used | | | | | | | 3 |
| Antifouling performance | X | X | X | X | X | X | X | X | X | X | X | ○ | ○ | X |
| Luster of glaze layer | ○ | ○ | ○ | ○ | X | X | ○ | X | X | X | X | ○ | ○ | ○ |
| Pore generation amount | ○ | X | X | X | X | X | X | X | ○ | X | X | X | ○ | ○ |
| Color (semi-opaque) of glaze layer | ○ | ○ | X | ○ | ○ | ○ | ○ | ○ | ○ | ○ | X | X | X | ○ |

The invention claimed is:

1. A glaze composition containing a glaze forming material, wherein a median diameter after grinding and mixing of said glaze forming material is within a range of 4 to 5 μm, and upon baking, said glaze forming material forming a baked product comprising constituents:
 (a) 55.0 to 67.0 wt % of $SiO_2$;
 (b) 8.0 to 11.0 wt % of $Al_2O_3$;
 (c) 2.0 to 8.0 wt % of $SnO_2$;
 (d) 15.0 to 21.0 wt % of a divalent metal oxide; and
 (e) 4.0 to 6.0 wt % of a monovalent metal oxide;
with respect to a total weight of said baked product.

2. The glaze composition as set forth in claim 1, wherein said glaze forming material comprises, with respect to a total weight of said glaze forming material,
 (a) 63.0 to 67.0 wt % of $SiO_2$;
 (b) 8.0 to 10.0 wt % of $Al_2O_3$;
 (c) 2.0 to 4.0 wt % of $SnO_2$;
 (d) 16.0 to 20.0 wt % of a divalent metal oxide; and
 (e) 4.0 to 6.0 wt % of a monovalent metal oxide.

3. The glaze composition as set forth in claim 1, wherein the constituent (d) comprises, with respect to the total weight of said glaze forming material,
 (d1) 10.0 to 12.0 wt % of CaO conversion; and
 (d2) 5.0 to 8.0 wt % of ZnO.

4. The glaze composition as set forth in claim 3, wherein the constituent (d) comprises (d3) 1.0 wt % or less of MgO, with respect to the total weight of said glaze forming material.

5. The glaze composition as set forth in claim 1, wherein said monovalent metal oxide (e) comprises, with respect to the total weight of said glaze forming material,
 (e1) 1.0 wt % or more of $Na_2O$; and
 (e2) 1.0 wt % or more of $K_2O$.

6. The glaze composition as set forth in claim 1, wherein said glaze forming material contains a frit, which is obtained by vitrifying a material containing at least one of the constituents (a) to (e) and grinding the vitrified material.

7. The glaze composition as set forth in claim 1, wherein a material containing the constituent (a) of said glaze forming material is a powder having a particle size of 30 pm or less.

8. The glaze composition as set forth in claim 1, wherein a material containing the constituent (c) of said glaze forming material is a powder having a median diameter of 0.2 to 4.0 μm.

9. The glaze composition as set forth in claim 1, wherein said glaze forming material is prepared by grinding a material containing at least one of the constituents (a) and (c) to obtain a powder or a slurry, then mixing materials containing the remaining constituents with said powder or said slurry, and grinding a resultant-mixture to obtain a powder of said glaze forming material having a required particle size or a slurry thereof.

10. The glaze composition as set forth in claim 9, wherein said glaze forming material is prepared by grinding a material containing the constituent (a) to obtain a powder having a median diameter of 5 μm or less or a slurry thereof, then mixing materials containing the remaining constituents (b) to (e) with said powder or said slurry, and grinding a resultant mixture to obtain a powder of said glaze forming material having a required particle size or a slurry thereof.

11. The glaze composition as set forth in claim 9, wherein said glaze forming material is prepared by grinding a material containing the constituent (c) to obtain a powder having a median diameter of 1.5 to 2 μm or a slurry thereof, then mixing materials containing the remaining constituents (a), (b), (d) and (e) with said powder or said slurry, and grinding a resultant mixture to obtain a powder of said glaze forming material having a required particle size or a slurry thereof.

12. The glaze composition as set forth in claim 9, wherein said glaze forming material is prepared by grinding materials containing the constituents (a) and (c) to obtain a mixed powder having a median diameter of 5 μm or less or a slurry thereof, then mixing materials containing the remaining constituents (b), (d) and (e) with said mixed powder or said slurry, and grinding a resultant mixture to obtain a powder of said glaze forming material having a required particle size or a slurry thereof.

13. The glaze composition as set forth in claim 9, wherein said glaze forming material is prepared by grinding a material containing the constituent (a) to obtain a powder having a median diameter of 5 μm or less or a slurry thereof, then mixing materials containing the remaining constituents (b) to (e) with said powder or said slurry, and grinding a resultant mixture to obtain a powder of said glaze forming material having a median diameter of 4 to 5 μm or a slurry thereof.

14. The glaze composition as set forth in claim 9, wherein said glaze forming material is prepared by grinding a material containing the constituent (c) to obtain a powder having a median diameter of 1.5 to 2 μm or a slurry thereof, then mixing materials containing the remaining constituents (a), (b), (d) and (e) with said powder or said slurry, and grinding a resultant mixture to obtain a powder of said glaze forming material having a median diameter of 4 to 5 μm or a slurry thereof.

15. The glaze composition as set forth in claim 9, wherein said glaze forming material is prepared by grinding materials containing the constituents (a) and (c) to obtain a mixed powder having a median diameter of 5 μm or less or a slurry thereof, then mixing materials containing the remaining constituents (b), (d) and (e) with said mixed powder or said slurry, and grinding a resultant mixture to obtain a powder of said glaze forming material having a median diameter of 4 to 5 μm or a slurry thereof.

16. The glaze composition as set forth in claim 1, wherein the materials containing the constituents of said glaze forming material are ground by means of ball milling using alumina balls.

17. The glaze composition as set forth in claim 1, wherein materials containing the constituents of said glaze forming material are ground by means of ball milling using a pot with an alumina liner and alumina balls.

18. The glaze composition as set forth in claim 1, comprising a pigment.

19. An antifouling ceramic ware produced by forming a layer of said glaze composition as set forth in claim 1 on a dried base surface of a raw ceramic ware, and baking said layer at a temperature of 1150 to 1250° C. for 8 hours or more to obtain a glaze layer on a baked base surface of the ceramic ware.

20. The antifouling ceramic ware as set forth in claim 19, wherein an X-ray diffraction profile of said glaze layer has only diffraction peaks resulting from $SnO_2$ crystal.

21. The antifouling ceramic ware as set forth in claim 19, wherein an X-ray diffraction profile of said glaze layer has only diffraction peaks resulting from $CaSnSiO_5$ crystal.

22. The antifouling ceramic ware as set forth in claim 19, wherein an X-ray ray diffraction profile of said glaze layer has only diffraction peaks resulting from crystals of $SnO_2$ and $CaSnSiO_5$.

23. The antifouling ceramic ware as set forth in claim 19, wherein a thickness of said glaze layer is within a range of 0.2 to 1.2 mm.

* * * * *